United States Patent
Przelomiec et al.

[19]

[11] Patent Number: 5,805,645
[45] Date of Patent: Sep. 8, 1998

[54] CONTROL CHANNEL SYNCHRONIZATION BETWEEN DBC AND CELLULAR NETWORKS

[75] Inventors: Thomas A. Przelomiec; Thomas A. Brown, both of Lynchburg, Va.

[73] Assignee: Ericsson Inc., Research Triangle Park, N.C.

[21] Appl. No.: 622,631

[22] Filed: Mar. 27, 1996

Related U.S. Application Data

[63] Continuation-in-part of Ser. No. 906,438, Jun. 30, 1992, abandoned.

[51] Int. Cl.⁶ .............................. H04L 7/00; H04Q 7/20; H04Q 7/00; H04B 7/00
[52] U.S. Cl. .................. 375/354; 375/206; 455/436; 455/439; 455/524; 370/328; 370/331; 370/336; 370/350
[58] Field of Search .................... 375/354, 206; 455/436, 437, 438, 439, 502, 434, 515, 524, 525, 443; 370/328, 331, 335, 337, 336, 347, 350

[56] References Cited

U.S. PATENT DOCUMENTS

| | | |
|---|---|---|
| 3,902,161 | 8/1975 | Kiowski et al. . |
| 4,218,654 | 8/1980 | Ogawa et al. . |
| 4,255,814 | 3/1981 | Osborn . |
| 4,317,220 | 2/1982 | Martin . |
| 4,411,007 | 10/1983 | Rodman et al. . |
| 4,414,661 | 11/1983 | Karlstrom . |
| 4,472,802 | 9/1984 | Pin et al. . |
| 4,475,246 | 10/1984 | Batlivala et al. . |

(List continued on next page.)

FOREIGN PATENT DOCUMENTS 2268366  1/1994  United Kingdom .

OTHER PUBLICATIONS

"A New Modulation Scheme for Multitransmitter Simulcast Digital Mobile Radio Communication", Hattori et al., Electrical Communication Laboratories Nippon Telegraph and Telephone Public Corp., pp. 83–88.

*Primary Examiner*—Chi H. Pham
*Assistant Examiner*—Khai Tran
*Attorney, Agent, or Firm*—Burns, Doane, Swecker & Mathis, L.L.P.

[57] ABSTRACT

A downbanded Cellular network (DBC) is provided to supplement an adjacent or coincident standard Cellular network. The control channels used by the DBC and standard Cellular network are synchronized to ensure proper hand-off between the DBC network and the standard network. Synchronization is achieved by monitoring the separation in time between timing pulses transmitted by the DBC network and the standard Cellular network.

17 Claims, 7 Drawing Sheets

U.S. PATENT DOCUMENTS

| | | |
|---|---|---|
| 4,516,269 | 5/1985 | Krinock . |
| 4,525,861 | 7/1985 | Freeburg . |
| 4,570,265 | 2/1986 | Thro . |
| 4,578,815 | 3/1986 | Persinotti . |
| 4,597,105 | 6/1986 | Freeburg . |
| 4,608,699 | 8/1986 | Bativala et al. . |
| 4,696,051 | 9/1987 | Breeden . |
| 4,696,052 | 9/1987 | Breeden . |
| 4,718,109 | 1/1988 | Breeden et al. . |
| 4,782,499 | 11/1988 | Clendening . |
| 4,800,564 | 1/1989 | DeFazio et al. . |
| 4,850,032 | 7/1989 | Freeburg . |
| 4,866,710 | 9/1989 | Schaeffer ................................ 370/330 |
| 4,903,262 | 2/1990 | Dissosway et al. . |
| 4,903,321 | 2/1990 | Hall et al. . |
| 4,905,302 | 2/1990 | Childress et al. . |
| 4,918,437 | 4/1990 | Jasinksi et al. . |
| 4,926,496 | 5/1990 | Cole et al. . |
| 4,939,746 | 7/1990 | Childress . |
| 4,968,966 | 11/1990 | Jasinski et al. . |
| 4,972,410 | 11/1990 | Cohen et al. . |
| 5,003,617 | 3/1991 | Epsom et al. . |
| 5,014,344 | 5/1991 | Goldberg . |
| 5,046,128 | 9/1991 | Bennett . |
| 5,052,028 | 9/1991 | Zwack . |
| 5,054,113 | 10/1991 | Jasinski . |
| 5,105,439 | 4/1992 | Bennett et al. . |
| 5,127,101 | 6/1992 | Rose, Jr. . |
| 5,172,396 | 12/1992 | Rose, Jr. et al. . |
| 5,218,717 | 6/1993 | Reitberger . |
| 5,257,404 | 10/1993 | Goreham et al. . |
| 5,278,892 | 1/1994 | Bollinger et al. ....................... 455/442 |
| 5,410,588 | 4/1995 | Ito . |
| 5,416,808 | 5/1995 | Witsaman et al. . |
| 5,594,761 | 1/1997 | Brown . |

CONTROL CHANNEL SYNCHRONIZATION BETWEEN DBC AND CELLULAR NETWORKS

RELATED APPLICATIONS

This application is a continuation-in-part of U.S. patent application Ser. No. 07/906,438, entitled "Control Channel Timing Detection and Self Correction for Digitally Trunked Simulcast Radio Communications System" by Thomas A. Brown, filed on Jun. 30, 1992 now abandoned. This application is also related to the following applications filed on the same day as the present application: U.S. application Ser. No. 08/622,311, entitled "Downbanded Cellular Systems and Methods" by Thomas A. Przelomiec; and U.S. application Ser. No. 08/622,403, now U.S. Pat. No. 5,722,078, entitled "A Method and Apparatus for Locating a Digital Control Channel in a Downbanded Cellular System" by Thomas A. Przelomiec and Alex Krister Raith. The disclosures of each of these patent applications are expressly incorporated here by reference.

BACKGROUND

The present invention is directed generally to radiocommunication systems and, more particularly, to techniques for synchronizing control channels between separate Cellular networks.

The Cellular telephone industry has made phenomenal strides in commercial operations in the United States as well as the rest of the world. Growth has far exceeded expectations in moor metropolitan areas, Yet the increased number of users presents many challenges, such as how to ensure sufficient system capacity to accommodate the increased number of users.

One way to increase capacity is by increasing the efficiency in which the available Cellular spectrum is used. For instance, converting older analog systems to digital systems has improved system capacity. In North America, this change was implemented by transitioning from the analog AMPS system to a hybrid system employing both digital and analog access technologies, which is known as IS-54. IS-54 employs FDMA to carry out the analog processing of calls, and uses TDMA to perform digital processing of calls. Another hybrid system, IS-95, uses spread spectrum techniques (CDMA) to perform digital processing of calls, resulting in yet a further improvement in carrying capacity. IS-54 divides the spectrum into 30 KHz wide channels.

The FCC has also responded to the needs of the Cellular community by allocating more spectrum for Cellular traffic. For example, the FCC originally allocated two blocks of frequencies for Cellular communications. Frequencies in the range of 825–845 MHz were employed in the uplink, while frequencies in the range of 870–890 MHz were used for the downlink. In 1987, the FCC allocated an additional 5 MHz to each block to increase the Cellular capacity. More recently, in 1994, the FCC announced that the Land Mobile Radio (LMR) portion of the radio spectrum would be regulated in the same manner as the Cellular spectrum, which enables the Cellular industry to employ Cellular technology in this rum. The LMR spectrum is contiguous with the Cellular band. It runs from 806–824 MHz for the uplink and 851–869 MHz for the downlink and has been traditionally used for transmission trunked dispatch service. The application of Cellular techniques in non-standard spectrum ranges is referred to herein as downbanded Cellular (DBC).

Yet the use of Cellular technology in non-standard spectrum ranges creates a number of challenges. Notably, portions of the LMR spectrum were allocated into 25 KHz channels, and accordingly, portions of the spectrum are owned by various network operators in 25 KHz chunks. Conceptually, it is possible to implement Cellular techniques using channels of 25 KHz, such as by employing the Japanese standard for Personal Digital Cellular (PDC), which already operates using channels having a 25 KHz bandwidth. Although this solution appears promising on the surface, it has a number of significant drawbacks. For example, the PDC system is incompatible with the No American DAMPS system, thereby adding to cost and complexity of integrating this technique into existing systems in the United States. From a cost and efficiency standpoint, it would be desirable to employ the same equipment traditionally used in the conventional Cellular spectrum in the LMR spectrum, or at least minimize the revisions necessary to render conventional Cellular technology compatible for use in the LMR spectrum.

Even if DAMPS compatible technology is used, integration of downbanded Cellular (DBC) networks with traditional pre-existing Cellular networks is problematic. At least in the initial stages of implementation, the DBC networks and their traditional Cellular counterparts will employ entirely separate switching centers (MSCs) operated by different network operators. Accordingly, the control channels used by the different MSCs will not be synchronized. This makes hand-off between a DBC network and a Cellular network (or vice versa) unreliable, and increases the chances of dropped calls.

Accordingly, it is one exemplary objective of the present invention to provide a downbanded Cellular network which is compatible with existing standard Cellular networks.

It is a further exemplary objective of the present invention to provide a mechanism for efficiently and reliably performing hand-off between a downbanded Cellular network and a standard Cellular network, or another downbanded Cellular network.

SUMMARY

These and other objectives arc achieved according to exemplary embodiments of the present invention by adapting a portion of the frequency spectrum allocated to Land Mobile Radio (LMR) for use as downbanded Cellular (DBC) channels. To promote compatibility with existing standard Cellular systems, the 25 KHz channels traditionally used within the LMR spectrum are converted into 30 MHz channels. The center frequencies of the 30 KHz DBC channels are selected to form an arithmetic series with the center frequencies employed in the traditional Cellular spectrum.

Another exemplary embodiment of the present invention provides a mechanism for synchronizing the control channels between a downbanded Cellular network and a standard Cellular network or another downbanded Cellular network. A monitor module is employed which monitors timing codes transmitted by a switching center MSC of the downbanded network and a switching center MSC of the standard Cellular network. Separation between the codes from the two networks by more than a prescribed threshold duration indicates an unsatisfactory state of synchronization between the two networks. In this event, corrective action is taken to ensure that hand-off occurs without a dropped call or loss of information.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Related application, Ser. No. 08/622,311 by Thomas A. Przelomiec, which is incorporated herein by reference, describes a manner of creating channels in the LMR spectrum. As discussed in the above referenced application, in the Cellular spectrum, a mobile transmitter is allocated channel numbers N encompassing $1 \leq N \leq 799$ and $990 \leq N \leq 1023$. The center frequencies assigned to these two groups are given by $f=(0.030* N+825.000)$ MHz and $f=(0.030*(N-1023)+825.000)$ MHz, respectively. The base transmitter in the Cellular spectrum is allocated channels encompassed by $1 \leq N \leq 799$ and $990 \leq N \leq 1023$. The center frequencies assigned to these two groups are given by $f=(0.030*N+870,000)$ MHz and $f=(0.030*(N-1023)+870.000)$ MHz, respectively, As indicated, the channels are 30 KHz wide.

In the LMR spectrum, a mobile transmitter is allocated channel numbers N encompassed by $1 \leq N \leq 720$ having center frequencies defined by $f=(0.025*N+805.9875)$ MHz. The base transmitter is allocated channel number ranging from $1 \leq N \leq 720$ having center frequencies defined by $f=(0.025*N+850.9875)$ MHz. As indicated, each channel is separated from its neighbor by 25 KHz. Specific countries may depart from this generalized description to varying extent (e.g. the U.S. actually divides the LMR spectrum up into 600 channels at 25 KHz spacing and 230 channels at 12.5 KHz spacing).

Figure 1:
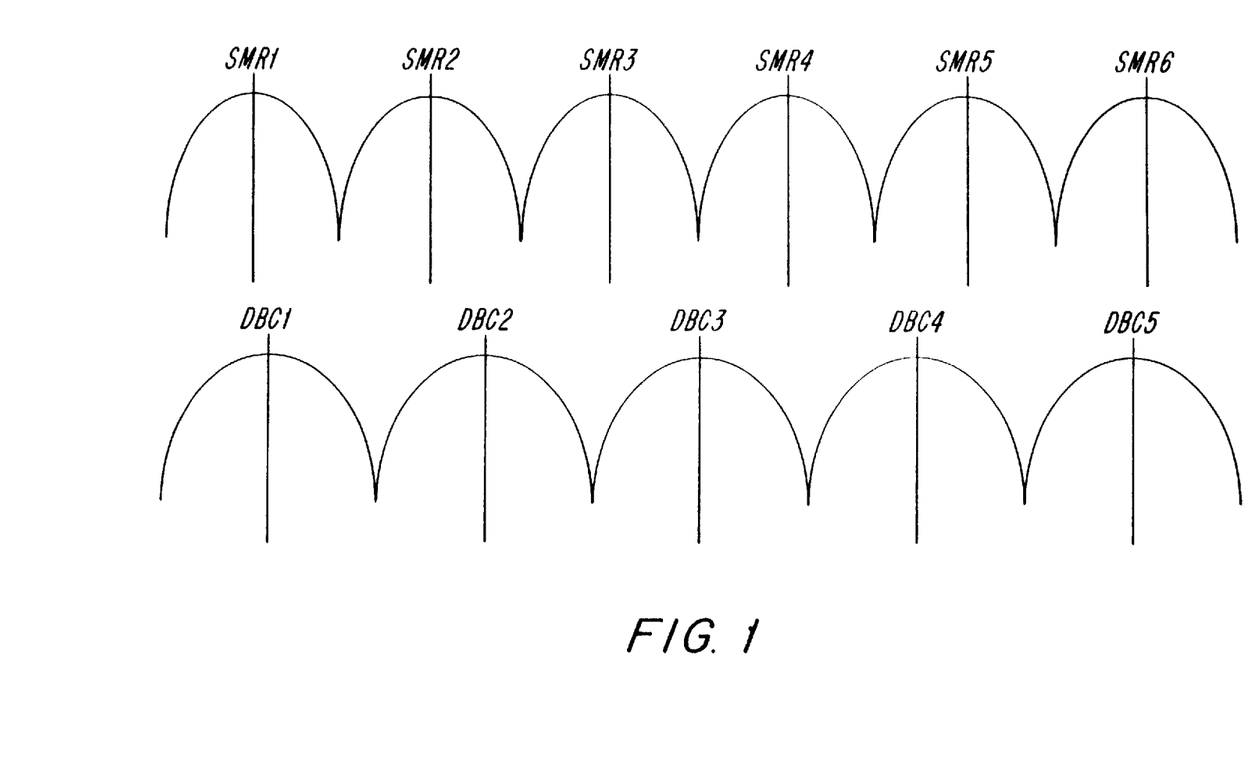
FIG. 1 illustrates the mapping of LMR channels into DBC channels according to the present invention at a conceptual level.

According to exemplary embodiments, the present invention dispenses with the traditional use of 25 KHz channels in the LMR spectrum, and instead uses 30 KHz channels to promote compatibility with the Cellular spectrum and the pre-existing equipment for operation therein. More specifically, every six 25 KHz channels are converted into a five 30 KHz channels, as illustrated in FIG. 1. The center frequencies of the 30 KHz channels are further chosen such that they are natural extensions of the center frequencies used in the standard Cellular spectrum. Specifically, according to the present invention, the channels for the mobile transmitters in the LMR spectrum now range from $1 \leq N \leq 600$ with center frequencies defined by $f=(0.030*N+805.980)$ MHz. The channels for the base transmitters in the LMR spectrum now range from $1 \leq N \leq 600$ with center frequencies defined by $f=(0.030*N+850.980)$ MHz, The choice of center frequencies given above allows network operator to employ pre-existing Cellular spectrum equipment for use in the LMR spectrum with very little modification. For instance, the standard Cellular mobile transmitter hardware is modified simply by adjusting its rf section for use in the LMR spectrum. Further, allocating the DBC center frequencies to complement the standard Cellular center frequencies allows a single communication technology to insert with both the DEC and Cellular spectrums.

Figure 2:
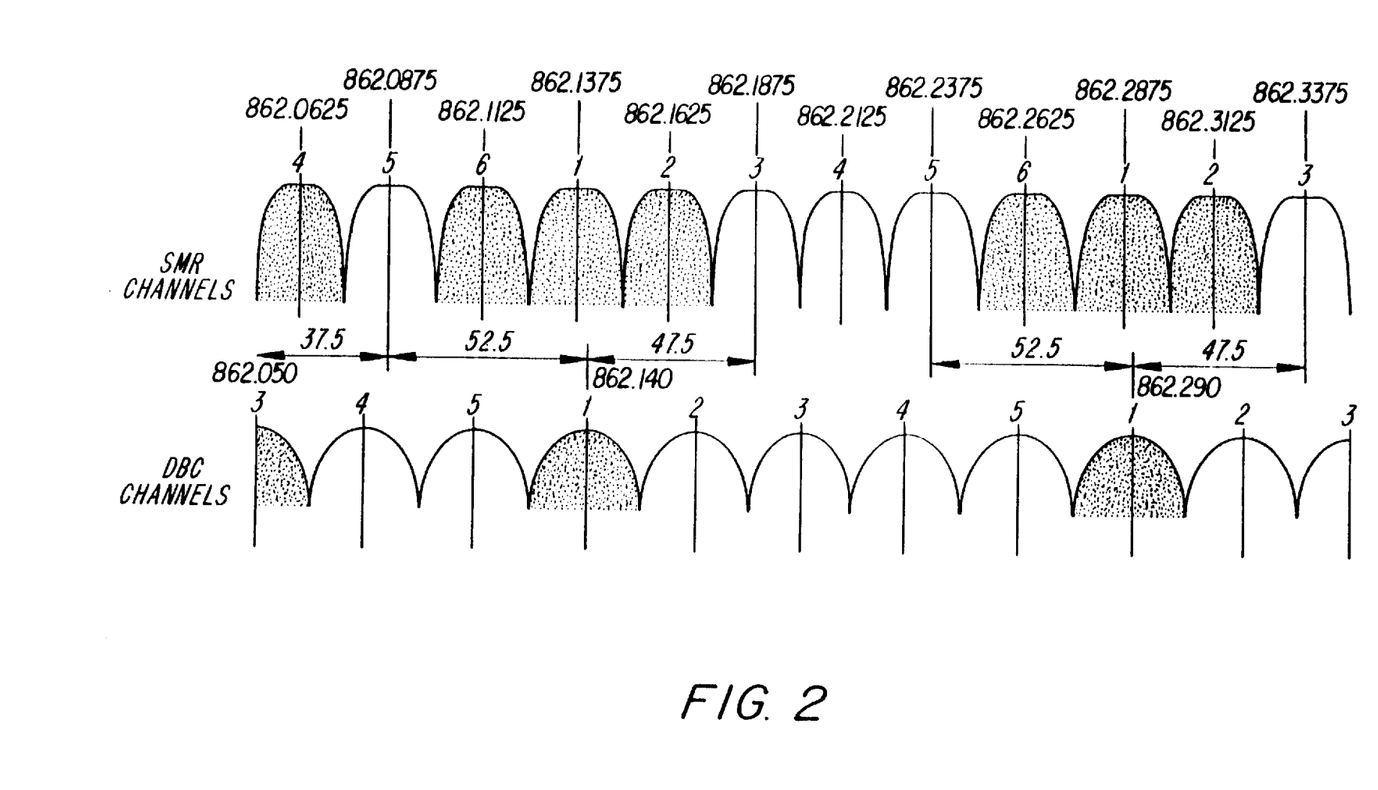
FIG. 2 illustrates a detailed example of how particular LMR channel groups can be rechannelized to provide DBC channels according to the present invention.

While the above channelization scheme is sensible for the reasons given, it is in many ways counter-intuitive. As illustrated in FIG. 2, certain network operators will own non-contiguous channels and channel groups. Specifically, the shaded portions on the upper tier of channels reflects LMR channels owned by a first network operator, while the non-shaded channels indicate LMR channels owned by a second network operator. The 25 KHz LMR channels are labeled with channels numbers 1–6 for illustration purposes only. Note that the LMR operator who owns the shaded portion of the spectrum has two contiguous blocks of LMR frequencies having 3 channels each. These blocks have a total width of 75 KHz, This would accommodate two contiguous blocks of expanded DBC channels having 2 channels each—or 60 KHz, A tpecrum-maximizing approach to the problem would therefore dictate converting the block of 3 LMR channels into 2 DEC channels. But using the center frequencies defined by the present invention, each block of 3 LMR channels can only be converted into 1 DBC channel as indicated by the shaded channels located on the lower tier of channels in FIG. 2.

The present invention therefore admittedly expands channels in manner which may fail to fully utilize the LMR spectrum. But Applicants have recognized that the advantages gained through the above described channelization far outweigh its negative aspects. First, as mentioned, pre-existing Cellular equipment can be used in the LMR spectrum with very little modification. Second, by forcing consistency among LMR network operators, the invention creates improvements which find applicability on a global scale, as opposed to a local LMR market. Third, the unused LMR spectrum is not "wasted"; rather, it serves a beneficial role as guard bands between adjacent channels. Spectrum not encompassed by a 30 KHz channel may also be used in conjunction with alternative 25 KHz technology (e.g. BRIC-SSON's EDACS Public Safety Trunking (PSI) Technology).

Further novel aspects of the channelization scheme employed by the present invention are discussed in the above referenced patent application, Ser. No. 08/623,311. The reader is referred to that application for a fuller understanding of the benefits afforded by the above described channelization scheme.

Having established a foundation for compatibility between the technology operating in the LMR and Cellular spectrums, the invention enables a user in the DBC network to switch between a DBC system and a Cellular system, or vice versa. For instance, an operator in a DBC network may wish to enter an adjacent geographic area which is not covered by the DBC system, but which is encompassed by a conventional Cellular system. The present invention allows the user to band-off between the DBC system and the Cellular system in mid-call. Alternatively, a geographic area may contain a DBC system which is coincident with a portion of a more encompassing Cellular network coverage. An operator may wish to travel beyond the bounds of the DBC coverage. Again, the present invention allows the user to hand-off between the DBC system and the Cellular system in mid-call.

Figure 3:
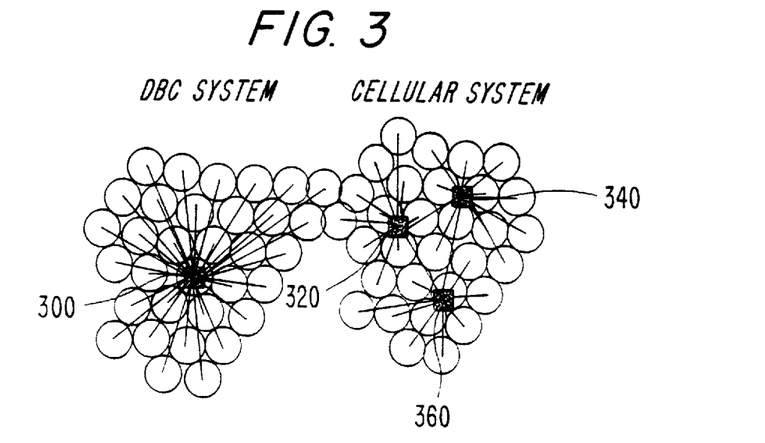
FIG. 3 illustrates a DBC system according to the present invention that is adjacent to a conventional Cellular system.
Figure 4:
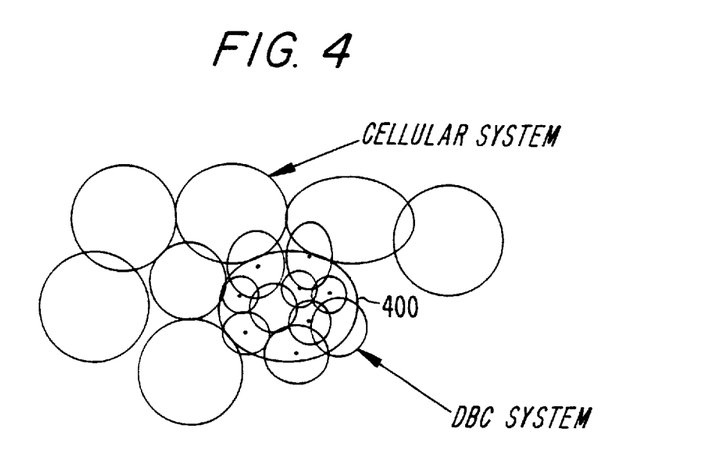
FIG. 4 illustrates a DBC system according to the present invention that is coincident with a conventional Cellular system.

These two scenarios are illustrated in FIGS. 3 and 4, respectively. In FIG. 3, a DBC system is positioned adjacent to a Cellular system. The DBC system is illustrated as having a plurality of cells each of which are supported by a mobile switching center (MSC) 300. Similarly, the Cellular system has a plurality of cells supported by three MSCs 320, 340 and 360. Each cell includes one or more base stations (not shown) connected to its respective MSC for transmitting signals to, and receiving signals from, mobile stations (also not shown) within the cell. In this exemplary configuration, the DBC system provides additional geographic coverage which would allow, for example, the operator of the Cellular system to provide greater geographic service to its customers.

In FIG. 4 each of the larger circles and ellipses represents a Cellular system and each of the smaller circles within Cellular system 400 represents a DBC system. Thus, this example illustrates a case where DBC systems are coincident with a Cellular system and can be used to supplement the Cellular system's capacity.

Figure 5:
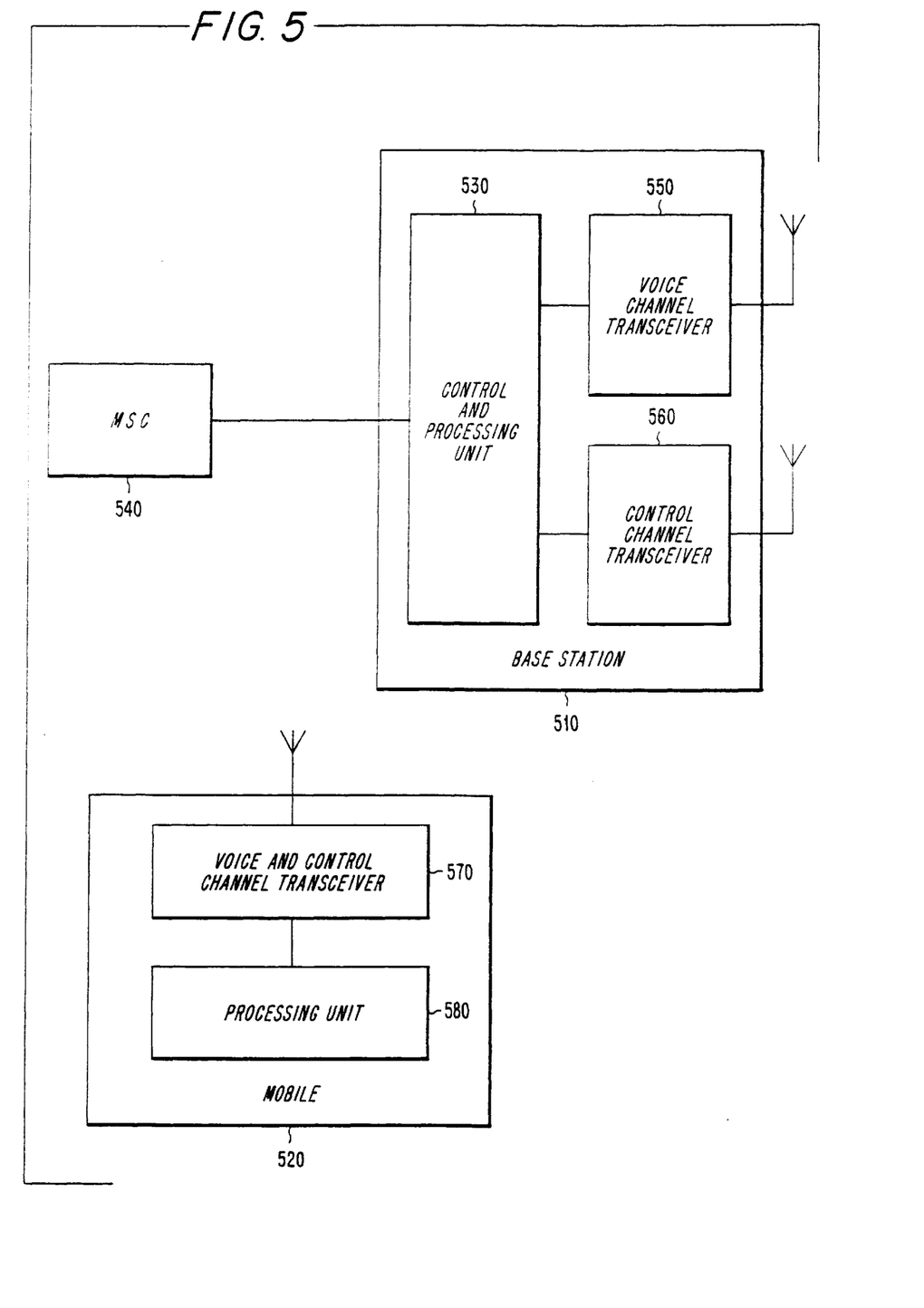
FIG. 5 illustrates a block diagram of a portion of an exemplary radio communication system according to the present invention.

Because of the channelization scheme employed in the present invention, the MSC and base stations used in the DBC networks of FIGS. 3 and 4 can comprise standard Cellular technology modified to operate in the LMR band. By way of illustration, and not limitation, FIG. 5 shows an exemplary MSC 540, base station 510 and mobile 520 which may be employed in the DBC network. The base station includes a control and processing unit 530 which is connected to the MSC 540 which in turn is connected to the public switched telephone network (not shown).

The base station 510 for a cell includes a plurality of voice channels handled by voice channel transceiver 550 which is controlled by the control and processing unit 530. Also, each base station includes a control channel transceiver 560 which may be capable of handling more than one control channel. The control channel transceiver 560 is controlled by the control and processing unit 530. The control channel transceiver 560 broadcasts control information over the control channel of the base station or cell to mobiles locked to that control channels. The voice channel transceiver handles the traffic or voice channels. When the mobile 520 first enters the idle mode, it will locate a DBC control channel from which it can acquire overhead information and listen for pages. Again, those skilled in the art will appreciate that DBC base stations and mobile stations can be manufactured using substantially the same components as conventional Cellular base stations and mobile stations, with certain exceptions, e.g., DBC equipment will have the rf capability to operate in the LMR frequency band. Readers interested in obtaining additional information relating to more specific details of exemplary mobile and base station implementations are directed to U.S. patent application Ser. No. 07/967,027 entitled "Multi-Mode Signal Processing" filed on Oct. 27, 1992 to P. Dent and B. Ekelund, which disclosure is incorporated here by reference.

Hand-off between different base stations within the DBC network also proceeds according to the standard protocols established for Cellular networks. See, for example, the standards set forth in IS-136.1 and IS-136.2 (PN-3474. 1 and PN-3474.2 of Dec. 15, 1995, respectively), incorporated hereinn by reference. However, hand-off from a DBC base station and a Cellular base station presents a special circumstance. More specifically, the MSCs of the DBC network are independent of the MSCs of the Cellular network, and are typically owned by different network operators. There is no common command center, Accordingly, the information transmitted on the control channels of the DBC base station is not necessarily synchronized with the information transmitted on the control channels of the Cellular base stations. Thus, before hand-off can reliably occur, the MSCs of the two different networks must communicate with each other to ensure adequate synchronization in their control channel transmissions, Otherwise, calls may be dropped, or bits may be discarded. Also, error checking capabilities may be disrupted.

Generally speaking, the present invention ensures that the control channels are synchronized by employing the monitor module set forth in the parent application Ser. No. 07/906, 438, now U.S. Pat. No. 5,594,761 entitled "Control Channel Timing Detection and Self Correction for Digitally Trunked Simulcast Radio Communications System" by Thomas A. Brown, which in incorporated herein by reference in its entirety. More specifically, the DBC network and the standard Cellular network employ one or more monitors, each of which receives control channel information from both the DBC network and the standard Cellular network. Bach monitor compares the control channel information received from the DBC network with control channel information received from the standard Cellular network. More particularly, the control channel includes various codes occurring at spaced time intervals, hereinafter referred to as timing codes. The monitor compares the time it receives control channel timing codes from the DBC network with the time it receives corresponding control channel timing codes from the standard Cellular network. If the control messages from the two networks are in sync, the timing codes from the DBC network will be received at substantially the same time as the control channel codes from the Cellular network. The separation between the DBC and Cellular timing codes reflects the extent to which the two networks are out of sync.

If the separation between DBC and Cellular timing codes is within a prescribed tolerance threshold then hand-off can proceed between the DBC and Cellular frequencies according to normal hand-off protocol (e.g. note the standards set forth in IS-136.1 and IS-136.2 incorporated by reference herein, and particularly section 2.1.3.3.5 of IS-136.2). More specifically, according to one exemplary embodiment, upon receiving a hand-off order from a base station, the mobile will transmit shortened timing bursts at the standard offset reference (SOR) position until it receives a time alignment order from the base station. Upon receiving the time alignment order, the mobile station adjusts its transmission timing accordingly and then begins transmitting time aligned bursts to the base station.

If the separation between DBC and Cellular control channel timing codes is outside the prescribed tolerance, then corrective action may proceed on either the MSC level or the base station level, In the former case, the clocks in MSCs are directly adjusted to ensure synchronization in the control channel information transmitted to the base stations. For example, the timing of the DBC, MSC can be adjusted so that it duplicates the timing of the standard Cellular MSC, or vice versa (depending on what MSC is designated "master"). Alternatively, both the DBC MSC and the standard Cellular MSC may be adjusted relative to common reference signals (e.g. as supplied through mutually connected telephone lines).

Corrective action on the base station level entails monitoring the synchronization between the two base stations involved in the hand-off. For instance, the DBC base station may adjust its transmission of control channel information to duplicate the timing of the transmission of control channel information by the standard Cellular base station or vice versa (depending on what base station is designated as "master"). Alternatively, the timing of both base stations may be adjusted by a normalization procedure.

Figure 6:
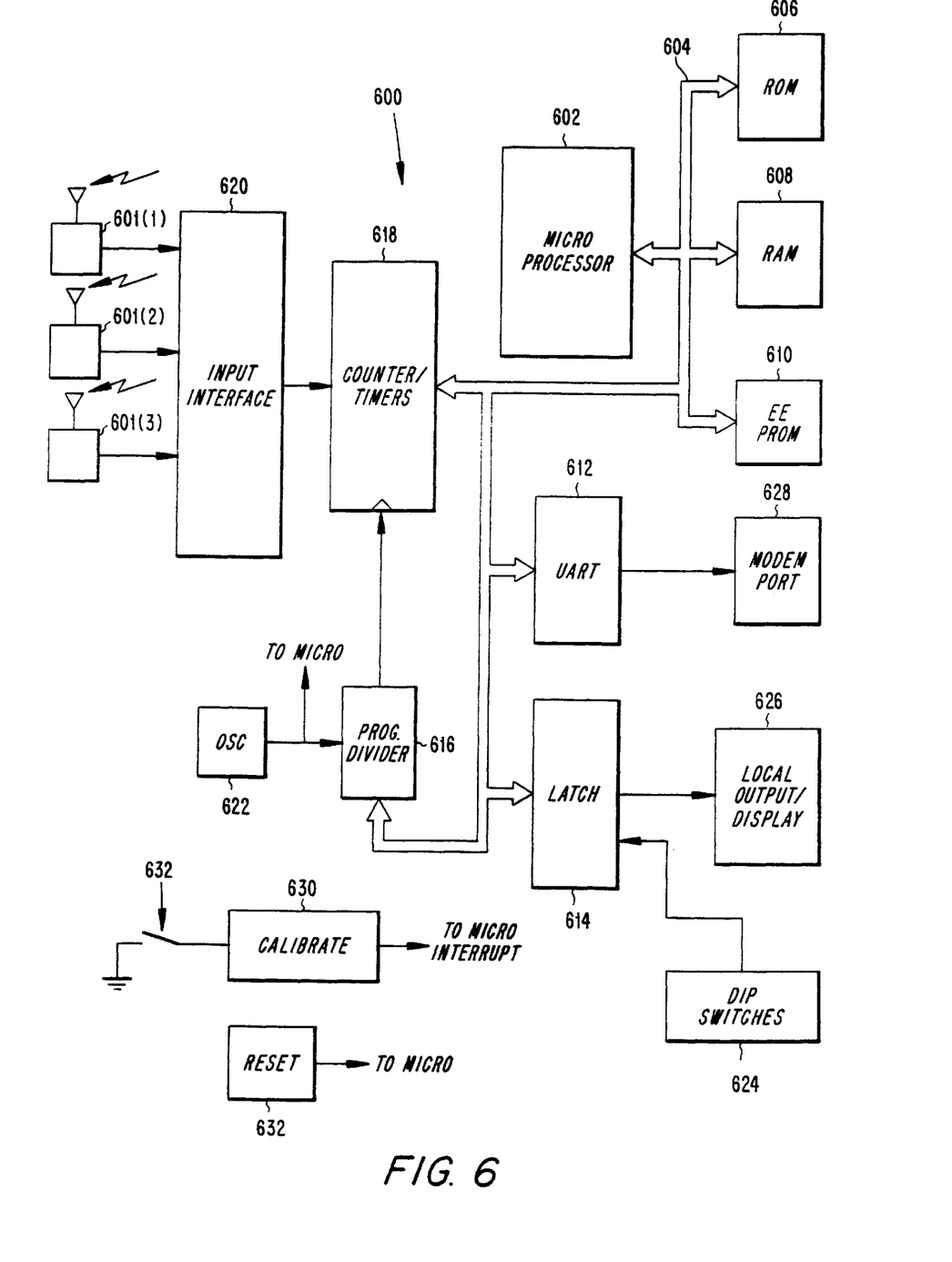
FIG. 6 is a schematic diagram of an exemplary microprocessor-based apparatus for measuring the synchronization between the control channels of a DBC and conventional Cellular systems.

Parent Application Ser. No. 07/906,438 outlines various techniques for measuring the extent to which a first transmitting station and a second transmitting station are synchronized with each other. FIG. 6 is a simplified schematic block diagram of an exemplary technique from that application which may be employed by the present invention. As shown therein, a monitor 600 receives a variety of timing signals from various MSCs though receivers 601(1)–601(3). For instance, receiver 601(1) receives timing codes from the DBC network, while receiver 601(2) receives timing codes from the Cellular network. Timing codes generated by any other MSC which may exist are received by corresponding receivers 601(3)–601(n), However, for to facilitate discussion, only three receivers are shown 601(3)–601(n). Monitor modules 600 may be located throughout the DBC and standard Cellular networks according to the particular design objectives of the network operators. Preferably, for the monitors will be located at the base station sites and/or the MSC sites of the networks.

As shown in FIG. 6, monitor 600 includes a microprocessor 602 which is coupled in a conventional manner via bus 604 to read only memory (TOM) 606, random access memory (RAM) 608, EEPROM 610, UART (universal asynchronous receiver/transmitter) 612, latch 614, programmable divider 616, and counter/timers 618. ROM 606 stores program control instructions for execution by microprocessor 602. RAM 608 provides writable memory locations for use by microprocessor 602 while it is executing, and nonvolatile EEPROM 610 is used primarily for storage of calibration information in the preferred embodiment (as will be explained). Microprocessor 602 executes routines for calibration, timing monitoring, counter/time control, and communication through UART 612 as will be explained in connection with FIGS. 7–9.

Counter/timers 618 are controlled by microprocessor 602 via bus 604, and act to precisely (with a precision determined by set-up and clock reference values) measure the time between receipt of inputs provided via a user interface 620. User interface 620 in the preferred embodiment is connected to receive signals from RF receivers 601(1)–601(3). User interface 620 includes circuitry on each input providing a single pulse for each MSC timing pulse input (with the starting edge of the pulse being a direct function of the corresponding MSC control channel frame timing).

An oscillator 622 generates a high frequency clock (e.g., 10 megahertz or higher) for microprocessor 602, and is also coupled to the input of programmable divider 616, Programmable divider 616 divides the rate of the clock signal provided by oscillator 622 by a divider that is set by microprocessor 602, and provides the divided rate clock signal to a clocking input of counter/timers 618. Since programmable divider 616 is programmable in response to data received from microprocessor 602, the microprocessor can directly control the rate (precision) of the counting operation performed by counter/timers 618.

A latch 614 provides an interlace to programmable DIP switches 624 (i.e., to permit local manual programming of certain perimeters of monitor 600) and also may provide outputs to local output/display 626 (which in the preferred embodiment may comprise LEDs and associated drives to provide a local display of faults).

UART 612 is coupled to a conventional modem port 628 so as to permit microprocessor 602 to communicate with external devices (e.g., a central controller) via a conventional telephone line or other convenient link. A "calibrate" block 630 and associated momentary-on switch 632 provide momentary switch closure and debounce to locally initiate timing calibration (this switching function may also be remotely activated if desired). Depression of the momentary on calibration switch 632 causes monitor 600 to acquire the present relative timing of the inputs and store this as the "correct reference" timing. Reset block 632 provides an automatic power-reset, and may also provide a momentary-on manually-depressible switch for initiating a reset of monitor 600.

Figure 7:
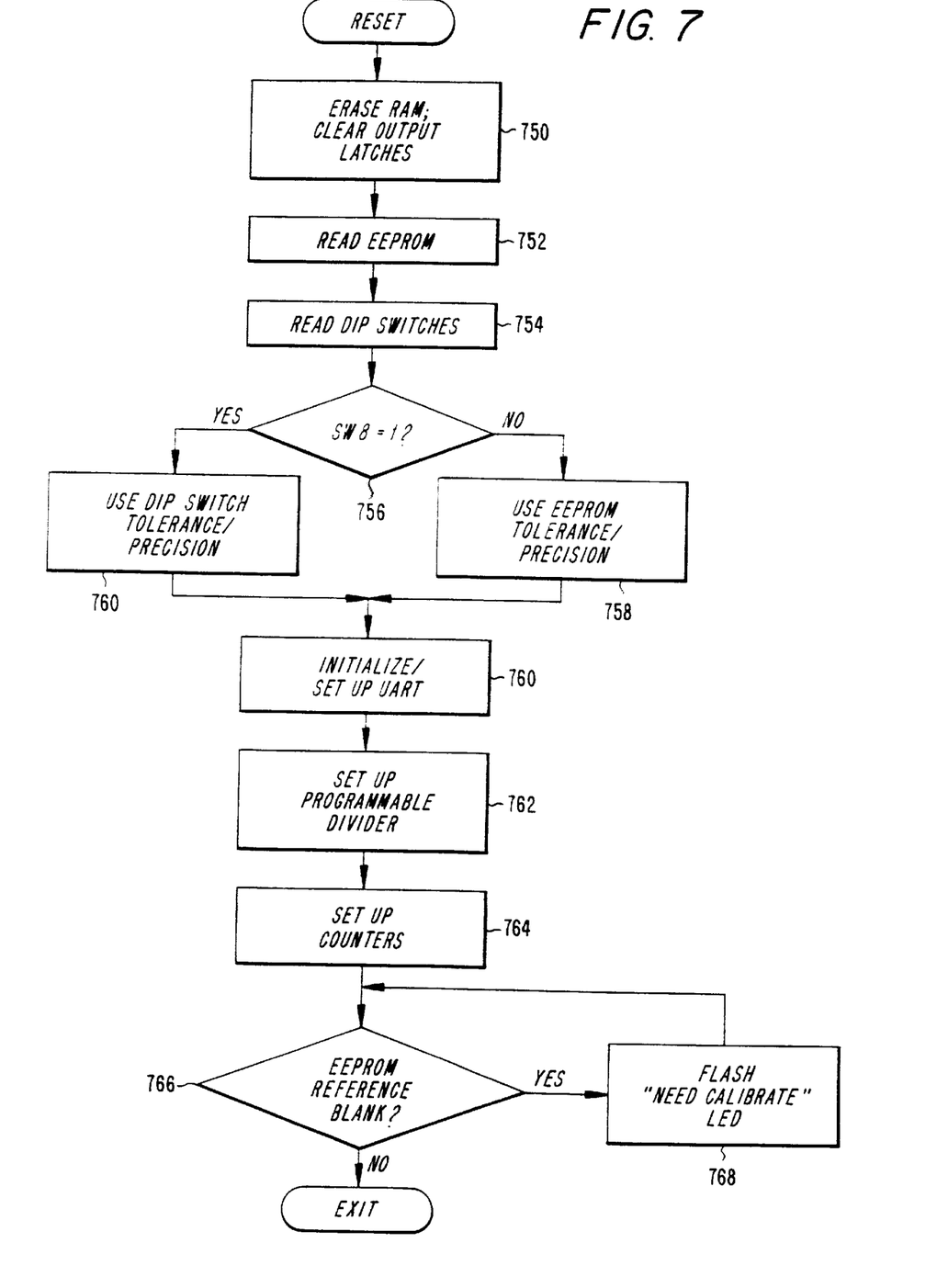
FIGS. 7–9 are schematic flow charts showing exemplary program control steps performed by the embodiment shown in FIG. 6.

FIG. 7 is a schematic flowchart of exemplary program control steps performed by microprocessor 602 upon a power on (or manual) reset. Microprocessor 602 first erases RAM 608 and the clears output latch 614 (block 750). Microprocessor 602 then reads the contents of EEPROM 610 and DIP switches 624, and stores those contents into appropriate locations within RAM 608 for later reference clocks 752, 754). Microprocessor 602 then tests a predetermined bit of DIP switch 624 (decision block 656) to determine whether it should use tolerance/decision data stored within EEPROM 610 (block 758) or whether it should instead use values programmed manually via DIP switches 624 (block 760). DIP switches 624 in the preferred embodiment thus provide a "manual override" function so as to permit local manual programming of the default tolerance and precision data stored within EEPROM 610.

Microprocessor 602 subsequently initializes and sets up UART 612 (block 760), sets up programmable interval timer 616 (i.e., by writing appropriate values obtained from one of blocks 760, 758) (block 762), and then sets up counter/timers 618 (block 764) (similarly by using appropriate values obtained via blocks 758 or 760).

Microprocessor 602 next tests the contents of RAM 608 to determine whether a relative timing value used as a reference for monitoring was obtained from EEPROM 610 by block 752 (decision block 766). If no reference timing values were obtained from EEPROM 610, then microprocessor 602 rotates alternating "1" and "0" values to latch 614 so as to "flash" local output/display 626 to indicate a need for calibration (block 268). Microprocessor 602 will continually loop in this fashion until the user depresses the calibrate switch 632 so as to provide a "calibrate" interrupt that causes the microsensor to execute the calibration routine shown in FIG. 7. If, on the other hand, appropriate reference data was read from EEPROM 610 by block 752, the reset routine exits to the main routine shown in FIG. 8.

Figure 8:
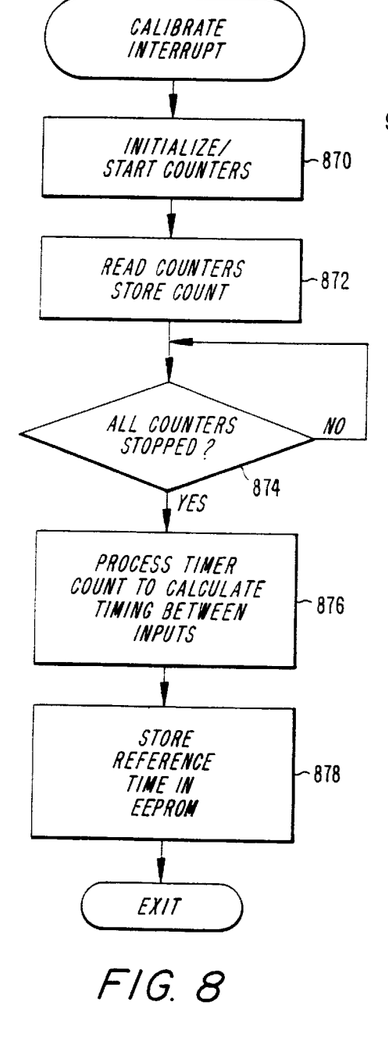

Referring now to FIG. 8, the calibrate interrupt routine is executed whenever a user manually depresses calibrate switch 632. In the preferred embodiment, the counter/timer block 618 includes a counter for each of MSCS. Such counters are programmable and may function as either an "up" counter or as a "one shot" in the preferred embodiment. Microprocessor 602 programs a "reference" counter to act as a one shot, and programs the other counters to function as up counters in the preferred embodiment. The counters count up from zero at the rate of the divided-down clock pulses prided by programmable divider 616. The counters begin counting up at the command of microprocessor 602, and stop counting upon receipt of a pulse outputted by associated RF receiver 601(1)–601(3) via input interface 620.

The calibrate routine first initializes and starts all of the counters within counter/timers block 618 (block 870), and then continually reads the counters and stores their associated counts (block 872). Once all counters have stopped (as tested for by decision block 874), microprocessor 602 compares the values it has read to calculate the relative timing between receipt of frame timing indication outputs provided by receivers 601(1)–601(3). So long as the calibration routine is executed during normal system operation when all of the site outbound control channels are substantially exactly synchronized with one another, block 876 performed in the course of the calibration routine will automatically obtain system reference data indicating "normal" timing differences between the various inputs to input interface 820 that are attributable to differential time delays inherent in the monitoring process (e.g., differential path links and the like as discussed above).

The microprocessor 602 also determines which input is "earliest" and uses this input as the timing reference. Under normal system operation when all sites are in substantial synchronization with one another, the inherent time delays associated with the monitoring process will always cause one of the three receiver 601(1)–601(3) outputs to become active prior to the other two receiver outputs. Reference data indicating differential delay between the reference input and each of the other inputs is obtained from the stopped counter values and stored in EPROM 610 (block 878).

Figure 9:
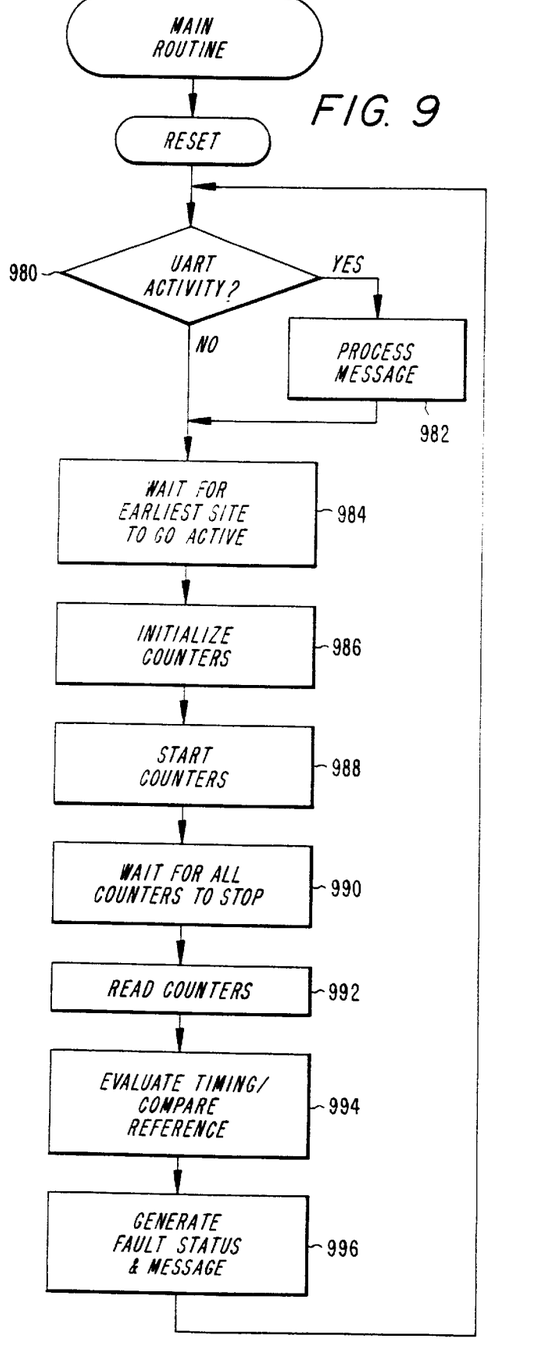

The main monitoring routine executed by microprocessor 602 is schematically shown in FIG. 9. Subsequent to reset (and assuming that calibration has already been performed), microprocessor 602 tests for messages received via modem 676 and UART 612 (decision block 980) and processes any such received messages (block 982). Microprocessor 602 has already initialized as a "one shot" the programmable counter within counter/timer 618 corresponding to the "earliest" (i.e., reference) input (as indicated by the calibration data stored in EEPROM 610) to input interface 620, Microprocessor 602 waits for occurrence of the one shot output corresponding to the "earliest" site to become active (block 984). Once microprocessor 602 detects that the "earliest" site output has become active, the microprocessor initializes the counters in the count up mode (block 986), and then enables the counters to count (block 988). Each of the counters begins to count, and stops counting when its associated receiver 601(1)–601(3) has produced an output indicating that a timing pulse has occurred on the corresponding MSC outbound control channel. Microprocessor 602 then waits for all of the counters to stop counting (block 990). At this point, microprocessor 602 reads all counters (block 992) and evaluates the read data using the reference data stored within EEPROM 610 (block 994). If one of the counters stores a value that is significantly different (i.e., outside of a preprogrammed tolerance from) the calibration-obtained data, microprocessor 602 generates a fault indication (block 996).

Upon detecting a fault indication, corrective action may proceed to ensure proper synchronization between the DBC and standard Cellular networks, as described in detail above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for synchronizing the control channel of a downbanded Cellular network with the control channel of a conventional Cellular network, comprising:

at least one downbanded Cellular switching center for processing control channel information at a first timing, and for generating first timing information which resects said first timing;

at least one standard Cellular switching center for processing control channel information at a second timing, and for generating second timing information which reflects said second timing; and a monitor for receiving said first timing information and said second timing information, and for comparing said first timing information with said second timing information to produce a comparison result, and for providing an error signal when the comparison result exceeds a prescribed threshold indicating that the at least one downbanded Cellular switching center is unsynchronized with said standard Cellular switching center.

2. The system of claim 1, further comprising:

logic for performing corrective action to improve the degree of synchronization between said at least one downbanded Cellular switching center and said at least one standard Cellular switching center in response to said comparison result exceeding said prescribed threshold.

3. The system of claim 1, further comprising:

logic for performing hand-off between said at least one downbanded Cellular switching center and said at least one standard Cellular switching center in response to said comparison result not exceeding said prescribed threshold.

4. The system of claim 3, wherein said band-off is from a downbanded Cellular network to an adjacent standard Cellular network.

5. The system of claim 3, wherein said hand-off is from a downbanded Cellular network to a coincident standard Cellular network having overlapping coverage.

6. The system of claim 1, wherein said at least one downbanded Cellular switching center generates information for transmission using the LMR spectrum.

7. The system of claim 1, wherein said at least one downbanded Cellular switching center transmits information on channels each having a width of 30 KHz.

8. The system of claim 7, wherein the centers of said channels are defined by the expression given by $f=(0.030*N+850.980)$ MHz, where N is the channel number defined by $1 \leq N \leq 600$.

9. A monitor for detecting whether a control channel produced by a downbanded Cellular network is synchronized with a control channel produced by a standard Cellular network, comprising:

a first receiver for receiving DBC timing indicia transmitted from said downbanded Cellular network, said DBC timing indicia defining a control channel timing state of said downbanded Cellular network;

at least one additional receiver for receiving standard Cellular timing indicia transmitted from a standard Cellular network, said standard Cellular timing indicia defining a control channel timing state of said standard Cellular network;

comparator logic for comparing said DBC timing indicia with said standard Cellular timing indicia and producing a comparison result;

an error generator for generating an error signal indicating that said downbanded Cellular network is not synchronized with said standard Cellular network.

10. A method for synchronizing the control channel of a downbanded Cellular network with the control channel of a conventional Cellular network, comprising:

generating, using a downbanded Cellular switching center, timing information which reflects the timing used in the transmission of control channel information in a downbanded Cellular network;

generating, using a standard Cellular switching center, timing information which reflects the timing used in the transmission of control channel information in a standard Cellular network;

comparing, using a monitor, said timing information generated by said at least one downbanded Cellular switching center with said timing information generated by said at least one standard Cellular switching center to produce a comparison result;

providing an error signal when the comparison result exceeds a prescribed threshold indicating that the at least one downbanded Cellular switching center is unsynchronized with said standard Cellular switching center.

11. The system of claim 10, further comprising:

performing corrective action to improve the degree of synchronization between said at least one downbanded Cellular switching center and said at least one standard Cellular switching center in response to said comparison result exceeding said prescribed threshold.

12. The system of claim 10, further comprising:

performing hand-off between said at least one downbanded Cellular switching center and said at least one standard Cellular switching center in response to said comparison result not exceeding said prescribed threshold.

13. The system of claim 12, wherein said hand-off is from a downbanded Cellular network to an adjacent standard Cellular network.

14. The system of claim 12, wherein said hand-off is from a downbanded Cellular network to a coincident standard Cellular network having overlapping coverage.

15. The system of claim 10, wherein said at least one downbanded Cellar switching center generates information for transmission using the LMR spectrum.

16. The system of claim 10, wherein said at least one downbanded Cellular switching center transmits information on channels each having a width of 30 KHz.

17. The system of claim 16, wherein the centers of said channels are defined by the expression given by f=(0.030*N+850.980) MHz, where N is a channel number defined by $1 \leq N600$.

* * * * *

UNITED STATES PATENT AND TRADEMARK OFFICE
CERTIFICATE OF CORRECTION

PATENT NO. : U.S. Patent No. 5,805,645

DATED : September 8, 1998

INVENTOR(S) : Thomas A. PRZELOMIEC et al.

It is certified that error appears in the above-identified patent and that said Letters Patent is hereby corrected as shown below:

Column 1, line 59 - change "rum" to -- spectrum--;

Column 2, line 10 - change "No" to -- North --;

Column 2, line 40 - change "arc" to -- are --;

Column 2, line 46 - change "MHz" to -- KHz --;

Column 4, line 35 - change "tpecrum" to --spectrum--;

Column 4, line 37 - change "DEC" to --DBC--;

Column 4, lines 55 and 56 - change "BRICSSON's" to -- ERICSSON'S--;

Column 4, line 56 - change "PSI" to --PST--;

Column 6, line 29 - change "Bach" to --Each--;

Column 7, line 36 - change "TOM" to --ROM--.

Signed and Sealed this

Ninth Day of February, 1999

Attest:

Attesting Officer

*Acting Commissioner of Patents and Trademarks*